(12) United States Patent
Miyata (10) Patent No.: US 8,358,435 B2
(45) Date of Patent: Jan. 22, 2013

(54) IMAGE PROCESSING DEVICE AND RECORDING MEDIUM CONTAINING PROGRAM THEREFOR

(75) Inventor: Yuji Miyata, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 576 days.

(21) Appl. No.: 12/610,691

(22) Filed: Nov. 2, 2009

(65) Prior Publication Data

US 2010/0110452 A1 May 6, 2010

(30) Foreign Application Priority Data

Oct. 31, 2008 (JP) ................... 2008-282062

(51) Int. Cl.
 *G06F 15/00* (2006.01)
 *G06K 1/00* (2006.01)
 *G06K 15/02* (2006.01)
 *H04N 1/60* (2006.01)
(52) U.S. Cl. ......................... 358/1.2; 358/1.9
(58) Field of Classification Search ................ 358/1.2
 See application file for complete search history.

(56) References Cited

U.S. PATENT DOCUMENTS

| 5,235,436 | A | 8/1993 | Sakamoto et al. |
| 6,646,759 | B1 | 11/2003 | Koga |
| 2010/0128287 | A1* | 5/2010 | Harris et al. ............... 358/1.2 |

FOREIGN PATENT DOCUMENTS

| JP | 1-149091 | 6/1989 |
| JP | 1-233513 | 9/1989 |
| JP | 3-254276 | 11/1991 |
| JP | 9-030044 | 2/1997 |
| JP | 9-167222 | 6/1997 |
| JP | 10-117266 | 5/1998 |
| JP | 2000-261670 | 9/2000 |
| JP | 2001-157041 | 6/2001 |
| JP | 2002-057886 | 2/2002 |
| JP | 2005-004318 | 1/2005 |
| JP | 2007-264748 | 10/2007 |
| JP | 2007-306432 | 11/2007 |
| JP | 2008-118671 | 5/2008 |

OTHER PUBLICATIONS

Japanese Official Action dated Sep. 28, 2010 with partial English translation.

* cited by examiner

*Primary Examiner* — Douglas Tran
(74) *Attorney, Agent, or Firm* — Scully, Scott, Murphy & Presser, P.C.

(57) ABSTRACT

An image processing device has a first print data receiving unit that receives first print data containing at least one image formation command, and a judging unit that judges whether each image formation command included in the first print data is a pixel number dependent command. An image processing device is configured such that a print image formation unit forms the print image on the printer-equivalent image formation area with increasing the number of pixels of the print image in accordance with the resolutions of the display-equivalent image formation area and the printer-equivalent image formation area if a judging unit judges that the image formation command is the pixel number dependent command, and the print image formation unit forms the print image on the printer-equivalent image formation area without modifying the print image if the judging unit judges that the image formation command is not the pixel number dependent command.

6 Claims, 8 Drawing Sheets

IMAGE PROCESSING DEVICE AND RECORDING MEDIUM CONTAINING PROGRAM THEREFOR

CROSS-REFERENCE TO RELATED APPLICATION

This application claims priority under 35 U.S.C. §119 from Japanese Patent Application No. 2008-282062 filed on Oct. 31, 2008. The entire subject matter of the application is incorporated herein by reference.

BACKGROUND

1. Technical Field

Aspects of the present invention relate to an image processing device and a recording medium containing a program for the image processing device.

2. Related Art

Conventionally, when a document containing a line and/or a pattern is displayed on a display device of a PC (Personal Computer) or printed by a printer, there is a case where an appearance of the printed image is different from that of the displayed image. In particular, a thickness the lines and/or a density of the pattern may be different depending on whether the image is displayed or printed.

One of the reasons causing such a difference in appearance is the difference of a resolution between the display device and the printer. In general, the resolution of the printer is higher than that of the display. Therefore, a line displayed on the display is thicker than a line printed on a print sheet if the thickness of the line is defined by the number of dots.

Conventionally, various techniques to deal with such a problem have proposed. In a typical example, it is proposed that a printer driver and a display driver installed in a host device (e.g., a PC) prints and displays objects using the same dithering pattern information that is obtained from a printer.

Recently, an OS (Operating System) of the PC or an application installed in the PC executes an image forming process such that the difference of appearance between the displayed image and the printed image is absorbed (i.e., optimization of the images are executed).

SUMMARY

However, there remains a problem in the conventional art as follows. Namely, when the resolution correction process is applied to lines and/or patterns are to be formed (displayed or printed) with the optimization, unnecessary correction process is applied, which causes the difference of appearance of the print image and/or display image.

Aspects of the invention provide an improved image processing device which enables to bring the appearance of the print image close to the appearance of the display image.

According to aspects of the invention, there is provided an image processing device which is provided with a display-equivalent image formation area, an image formed on the display-equivalent image formation area being displayed on a display device, a printer-equivalent image formation area, an image formed on the printer-equivalent image formation area being printed by a printer, a first print data receiving unit configured to receive first print data containing at least one image formation command, a judging unit configured to judge whether each image formation command included in the first print data is a pixel number dependent command that defines an image to be formed by the number of pixels, a display image formation unit configured to form a display image on the display-equivalent image formation area in accordance with each image formation command included in the first print data, a print image formation unit configured to form a print image on the printer-equivalent image formation area in accordance with each image formation command included in the first print data, and a transmission unit configured to transmit the print image formed on the printer-equivalent image formation area to the printer as second print data, The print image formation unit forms the print image on the printer-equivalent image formation area with increasing the number of pixels of the print image in accordance with the resolutions of the display-equivalent image formation area and the printer-equivalent image formation area if the judging unit judges that the image formation command is the pixel number dependent command. Further, the print image formation unit forms the print image on the printer-equivalent image formation area without modifying the print image if the judging unit judges that the image formation command is not the pixel number dependent command.

According to aspects of the invention, there is provided a recording medium containing a program for an image processing device, the program, when executed by a computer, causing the image processing device to execute a first receiving step of receiving first print data containing at least one image formation command, a judging step of judging whether each image formation command included in the first print data is a pixel number dependent command that defines an image to be formed by the number of pixels, a display image formation step of forming a display image on a display-equivalent image formation area in accordance with each image formation command included in the first print data, a print image formation step of forming a print image on a printer-equivalent image formation area in accordance with each image formation command included in the first print data, and a transmitting step of transmitting the print image formed on the printer-equivalent image formation area to the printer as second print data.

The print image forming step forms the print image on the printer-equivalent image formation area with increasing the number of pixels of the print image in accordance with the resolutions of the display-equivalent image formation area and the printer-equivalent image formation area if the judging unit judges that the image formation command is the pixel number dependent command. Further, the print image forming step forms the print image on the printer-equivalent image formation area without modifying the print image if the judging unit judges that the image formation command is not the pixel number dependent command.

DETAILED DESCRIPTION

Hereinafter, referring to the accompanying drawings, an embodiment and its modification according to aspects of the present invention will be described.

Figure 1:
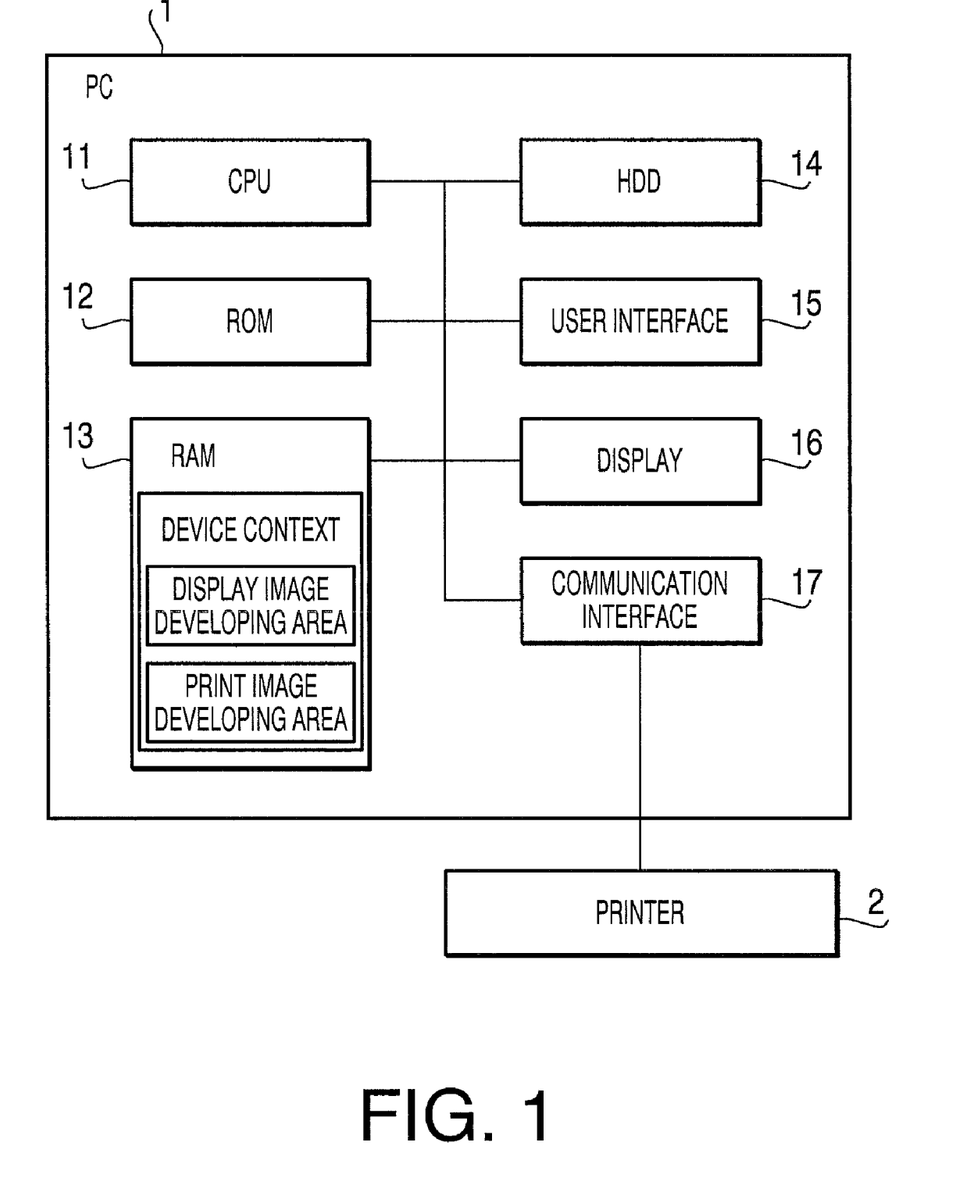
FIG. 1 is a block diagram showing a configuration of an image processing system having a printer and a PC (personal computer) according to an embodiment of the present invention.

As shown in FIG. 1, an image processing system includes a PC (Personal Computer) 1 and a printer 2.

The PC 1 is provided with a CPU (Central Processing Unit) 11, a ROM (Read Only Memory) 12, a RAM (Random Access Memory) 13, an HDD (Hard Disk Drive) 14, a user interface (operation unit) 15, a display 16 and a communication interface 17 as shown in FIG. 1.

The CPU 11 controls all components of the PC 1 and executes various operations in accordance with programs stored in the ROM 12 and the RAM 13. The programs include one which make the CPU 11 functions as a printer driver (print driver program), an OS (Operation System) and application programs.

The ROM 12 is a non-volatile memory and stores data of a BIOS (Basic Input Output System) and other read-only data, which is not updated usually.

The RAM 13 is a volatile memory used as a main memory accessed directly by the CPU 11. Software such as the OS and various application programs are retrieved from the HDD 14 and stored into the RAM 13 when executed. Further, results of various operations executed by the CPU 11 and other data retrieved from the HDD 14 are also temporarily stored into the RAM 13. A program that makes the CPU 11 function as the printer driver is retrieved from the HDD 14 and stored in the RAM 13. Then, the CPU 11 executes the process of the printer driver according to the program stored in the RAM 13.

The HDD 14 is a storage device that stores the OS, various application programs and various data files. The printer driver (program) is also stored in the HDD 14.

The operation unit 15 includes input devices through which various instructions are input by a user. Typically, the operation unit 15 is provided with a keyboard and a pointing device (e.g., a mouse). The display 16 is an output device to display various pieces of information for the user. Typically, the display 16 is a liquid crystal display.

The communication interface 17 is a serial interface (e.g., USB), a LAN (Local Area Network) interface or the like which can connect the PC 1 with the printer and/or other peripherals.

Note that, in the exemplary embodiment, the OS (e.g., Windows (registered trademark)) having a multitasking function is installed in the PC 1, and multiple processes are performed in parallel. Further, multiple processes coordinate to achieve various functions. The printer driver described below is also realized by one or more processes performed under the control of the OS.

In the PC 1, other applications (e.g., word processing software, spreadsheet software) also function as well as the printer driver. When the user, who is using one of such an application, operates to instruct printing, the application generates an image formation command corresponding to an image to be printed, and the application transmits an image formation command to a GDI (Graphics Device Interface) which is implemented in the OS. The printer driver also provides the image formation command to the GDI during a process which will be described later.

The GDI manages a device context, which is a virtualized image formation area, and generates display data and/or print data in association with the image formation in the device context. That is, a displayed image is formed on a display-equivalent area of the device context and a print image is formed on a printer-equivalent area of the device context. The applications and the print driver can provide the image formation command with the GDI by calling an API (Application Program Interface), which is a function for supplying a command to the GDI, in respective processes.

Figure 2:
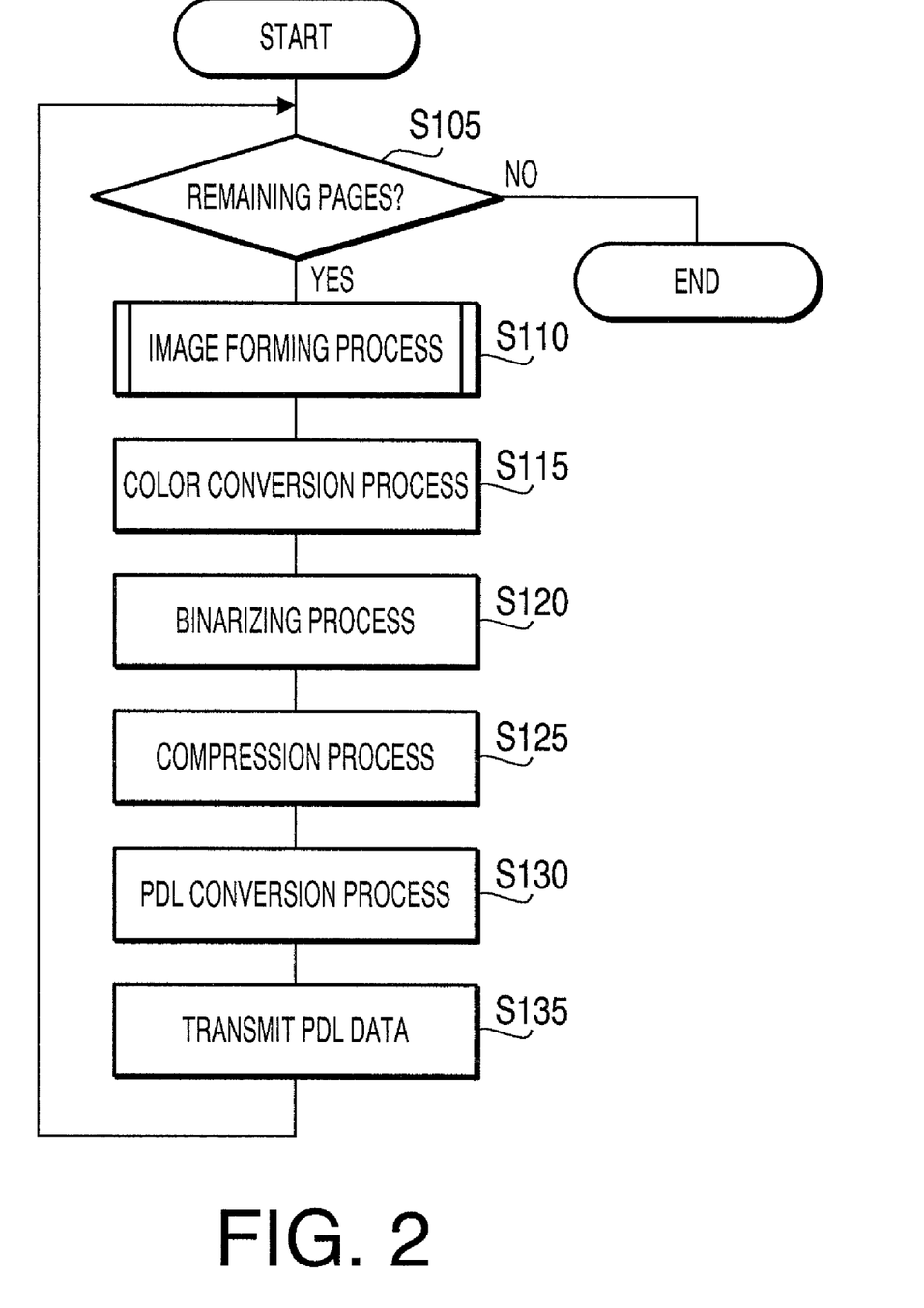
FIG. 2 shows a flowchart illustrating a print process performed in the PC according to the embodiment of the present invention.

Next, the print process performed by the printer driver will be described with referring to FIG. 2. Note that, since the printer driver (function) is realized by the CPU 11 executing the print driver (program), hereinafter, the printer driver function realized as the CPU 11 executes the printer driver (program) is also referred to as the "printer driver."

The print process is started in response to a print request issued by an application. After the print process is started, the printer driver judges whether there remains a pages to be printed (S105). When S105 is executed first time, since no page has been printed, data for at least one page is remained in a buffer of the RAM 13 (S105: YES). Therefore, the printer driver performs an image formation process corresponding to the page to be printed (S110).

The image formation process (S110) is a process in which the image formation commands corresponding to image objects included in one page are subsequently obtained from the application, and forms an image in an virtualized image forming area (i.e., device context). The image formation process will be described later.

After S110, the printer driver performs a color conversion process (S115) for converting the image formed in the virtualized image formation area to color image data composed of predetermined color components (e.g., CMYK: Cyan, Magenta, Yellow and Black color components).

Then, the printer driver executes a binarizing process (S120), which generates binary color image data based on the color image data converted in S115, and compresses each plane data to compressed data having a predetermined resolution (S125).

Further, the printer driver converts the compressed data to a PDL (Page description language) data corresponding to the printer 2 by adding control commands to the compressed data (S130). Then, the printer driver transmits the thus generated one page of PDL data to the printer 2 (S135). By processes described above, the PDL data for one page is transmitted to a spooler system, and the spooler system sends the PDL data to the printer 2.

After S135, the printer driver returns to S105. If there exists one or more remaining pages (S105: YES), the process repeats S105-S135 and transmits print data corresponding to each page of documents to the printer 2 subsequently. If the printer driver judges that there exists no remaining page after processing the last page to be printed (S105: NO), the print process shown in FIG. 2 is terminated.

Figure 3:
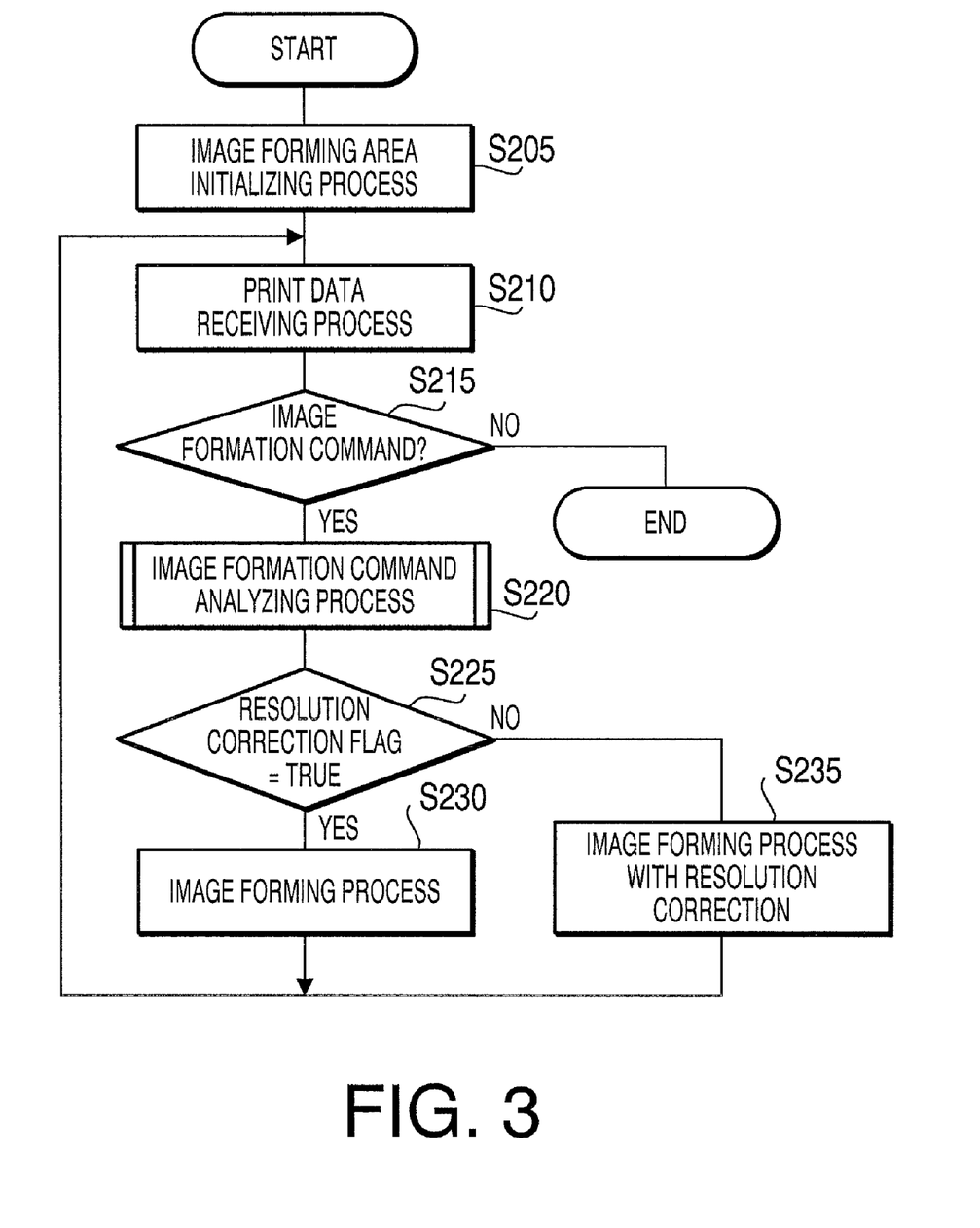
FIG. 3 shows a flowchart illustrating an image forming process performed in the PC according to the embodiment of the present invention.

Hereinafter, the image formation process called in S110 of the print process (FIG. 2) will be described in detail, referring to FIG. 3.

When the image forming process is started, the printer driver initializes the virtualized image forming area (S205), and then executes a process for receiving image formation commands (S210).

If the image formation command is not received (S215: NO), the image forming process shown in FIG. 3 is terminated since the judgment in S215 means that the print data for one page subjected to the image forming process has been processed.

On the other hand, if the image formation command is received (S215: YES), the process executes an image formation command analyzing process to judge whether the image formation command has been created taking a resolution correction in consideration (S220). The detail of the image formation command analyzing process will be described later. After execution of S220, a result of the analyzing process (i.e., True or False) is set to a resolution correction flag.

After execution of S215, the printer driver judges whether the resolution correction flag is True (S225). If the resolution correction flag is True (S225: YES), the printer driver executes the image formation process for forming an image in the virtualized image formation area based on the image formation command since the image formation command is created taking a resolution correction in consideration (S230).

If the resolution correction flag is False (S225: NO), the printer diver executes the image forming process with executing a resolution correction process since the image formation command has not been created taking a resolution correction in consideration (S235).

For example, when a resolution of the display is 96 DPI (Dots Per Inch) and a resolution of the printer is 600 DPI, a resolution ratio ((Printer Resolution)/(Display Resolution)) is calculated to be 6.25. Thus, if the image formation command is a command to form a line with 4 dots thickness, the image forming process performs the resolution correction by multiplying the line thickness (4 dots) by the resolution ratio (6.25) and forms a line with 25 dots thickness.

After execution of S230 or S235, the image forming process corresponding to one image formation command is finished. Then, the image forming process returns to S210 and repeats S210-S235 while there exists a remaining image formation command (S210: YES). When the printer driver judges that there exists no remaining image formation command (S215: NO), the image forming process shown in FIG. 3 is terminated.

Next, the analyzing process, which is called in S220 of FIG. 3, will be described referring to FIG. 4. In the following description, it is assumed that a document shown in FIG. 5A, which shows a displayed image thereof, is to be printed. FIG. 5B shows the print result of the document shown in FIG. 5A if no particular processes are applied.

Figure 5A:
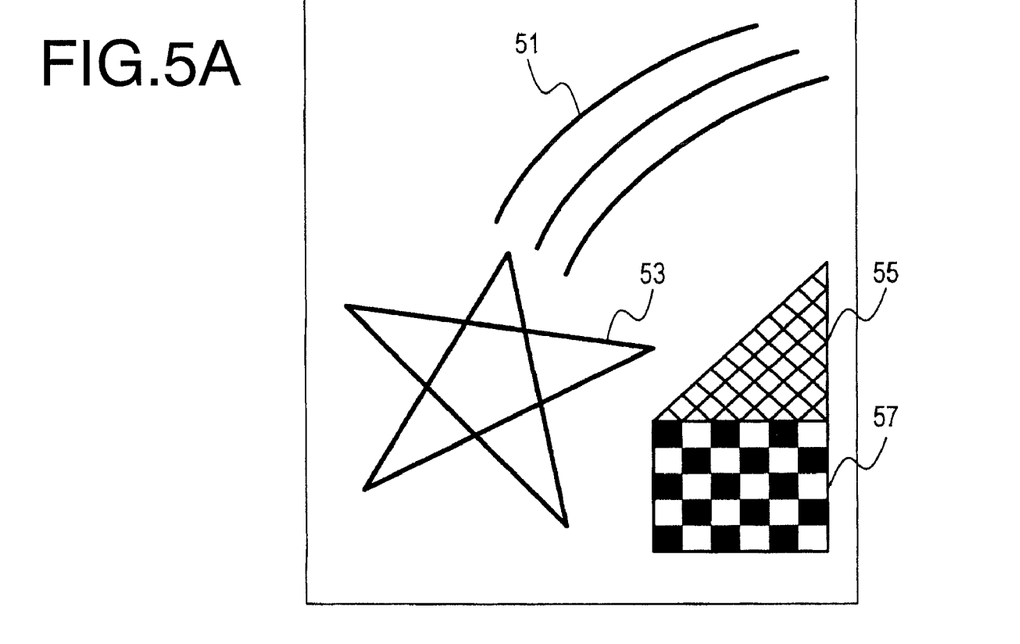
FIG. 5A shows an example of images displayed on a display device.

In the document shown in FIGS. 5A and 5B, image objects 51 and 53 formed with lines and image patterns 55 and 57 are contained. The image object 51 and the image pattern 55 are formed by the image formation commands created taking the resolution correction in consideration. Therefore, although no particular processes are applied, there is no difference in the appearance between the displayed image (FIG. 5A) and the printed image (FIG. 5B).

The image object 53 and the image pattern 57 are formed by the image formation commands which is not created taking the resolution correction in consideration. That is, the image object 53 and the image pattern 57 are defined by the number of pixels if formed without any particular processes. Therefore, a line of the printed image object 53 (FIG. 5B) is thinner than the displayed image object 53 (FIG. 5A), and a pattern density of the printed image pattern 57 (FIG. 5B) is finer than that of the displayed image pattern 57 (FIG. 5A). Therefore, the appearance of the image object 53 and the image pattern 57 are different between the displayed image and the printed image.

The analyzing process described below is configured to analyze whether the image formation command causes such a difference in appearance between the displayed image and the printed image.

When the analyzing process (FIG. 4) is started, the printer driver judges whether the image formation command is a line forming command (S305). If the image formation command is a line forming command (S305: YES), the printer driver performs a test image formation in a display-equivalent area (S310) and in a printer-equivalent area (S315).

It should be noted that the display-equivalent area is defined as a virtualized image formation area having a resolution same as the resolution of the display. Similarly, the printer-equivalent area is defined as a virtualized image formation area having a resolution same as the resolution of the printer.

The test image is formed in the display-equivalent area and the printer-equivalent area, in accordance with specified settings (e.g., line thickness, pattern density and the like) which are specified by parameters of the image formation command. For the test image, however, it is not necessary that the image is formed in accordance with parameters specifying positions and lengths of the lines. Rather, the test image may be formed using a simplified form (e.g., a line extending from the leftmost edge of the sheet to the rightmost edge of the sheet) so that only the line thickness can be judged.

Figure 6A:
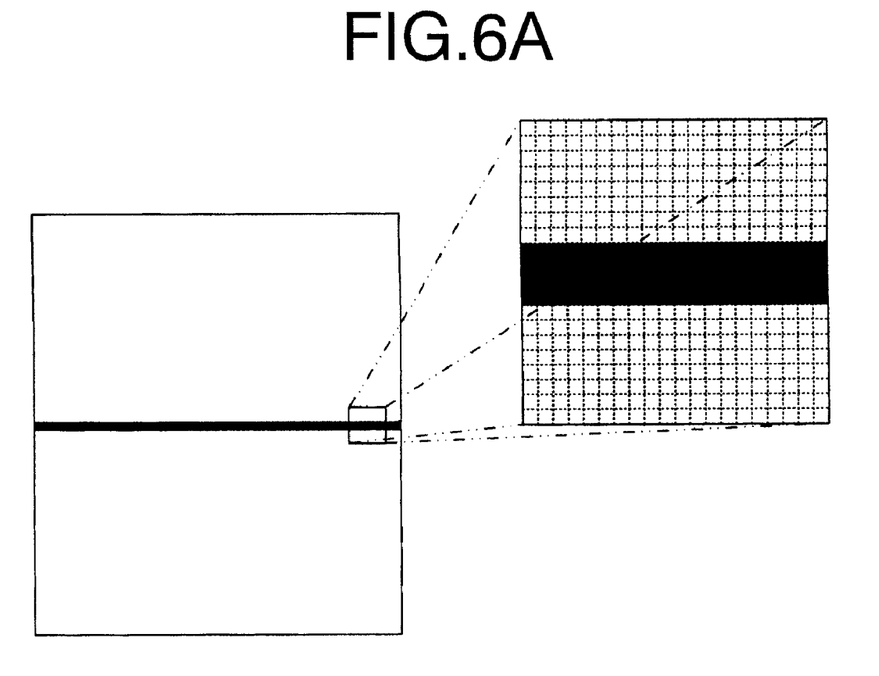
FIG. 6A shows an example of line images formed in a display-equivalent area by a test image formation.
Figure 6B:
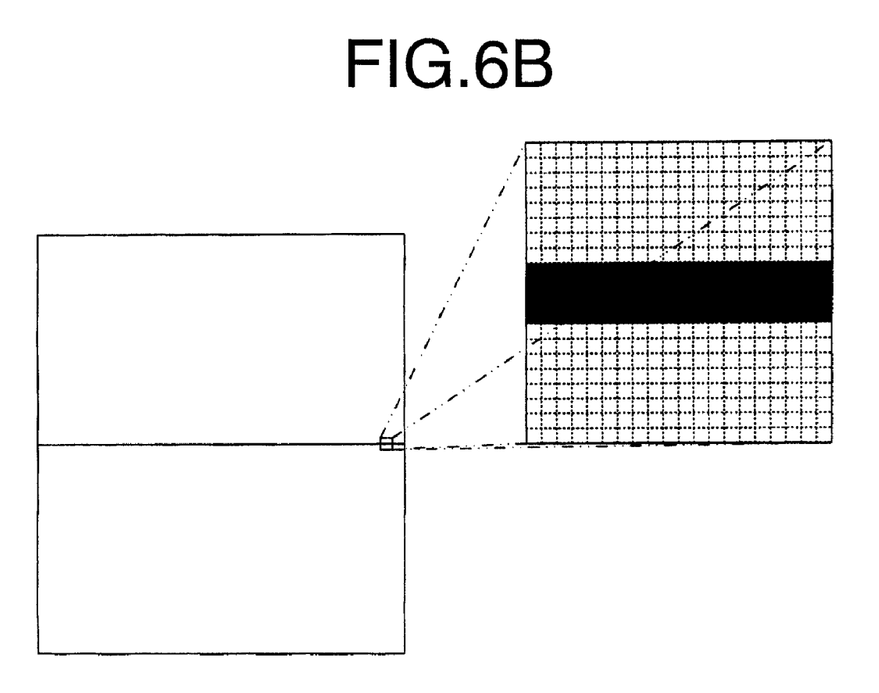
FIG. 6B shows an example of line images formed in a printer-equivalent area by the test image formation.

For example, since the image object 53 shown in FIG. 5A is formed by the image formation commands to form lines, the test image for the image object 53 may be formed with straight lines as shown in FIGS. 6A and 6B.

Each of the straight lines shown in FIGS. 6A and 6B has a 4-dot thickness as shown in an enlarged view on the right side area in FIGS. 6A and 6B. This is because the image formation command is a command to form a line having a 4-dot thickness.

Due to the difference of resolution between the display-equivalent area and the printer-equivalent area, even if the straight lines having the same thickness (i.e., the same number of pixels) are formed in the display-equivalent area and the printer-equivalent area, the appearances thereof are different from each other.

According to the embodiment, the printer driver judges whether the number of the pixels of the straight line formed in the display-equivalent area is equal to the number of the pixels of the straight line formed in the printer-equivalent area (S320). In the above examples shown in FIGS. 6A and 6B, the printer driver determines that the number of the pixels of the straight line formed in the display-equivalent area is equal to the number of the pixels of the straight line formed in the printer-equivalent area (S320: YES). In such a case, since the resolution correction is not considered by the image formation command, the printer driver sets the resolution correction flag to False (S325).

If the numbers of the pixels are different (S320: NO), the printer driver determines that the image formation command is a command of which the parameters for the resolution correction are set. Thus, the printer driver sets the resolution correction flag to True (S330).

In S305, it may be determined that the image formation command is not for a line formation (S305: NO). In such a case, the printer driver subsequently judges whether the image formation command is a filling command (S335).

If the printer driver determines that the image formation command is a filling command (S335: YES), the printer driver judges whether a brush type of the filling command is "pattern" (S340). Note that, there are two brush types: one is "pattern" which needs particular processes for the resolution correction, and the other is "monochrome color" which does not need the particular processes for the resolution correction since the print image is not influenced by the resolution in a case of "monochrome color." Thus, when the brush type is not "pattern" (S340: NO), the printer driver sets the resolution correction flag to True (S330).

When the brush type is "pattern," since an area of a unit pattern becomes smaller as the resolution becomes higher, it is necessary to increase the number of the pixels composing the unit pattern such that the area of the unit pattern in the quasi-print area is equal to the area of the unit pattern in the quasi-display area. If the brush type is "pattern" (S340: YES), the printer driver performs the trial image forming into the quasi-display area (S345) and into the quasi-printer area (S350) similar to S310 and S315.

When the test image is formed in the display-equivalent area and in the printer-equivalent area, image formation is executed according to a brush configuration that is specified by parameters of the image formation command. However, regarding the parameters specifying a pattern-filling area and the like, it is not necessary that the image is formed in accordance with the actual parameters. That is, only a simplified image (e.g., a pattern-filling of the entire area) necessary for judging the number of the pixels of the filling pattern may be used.

Figure 7A:
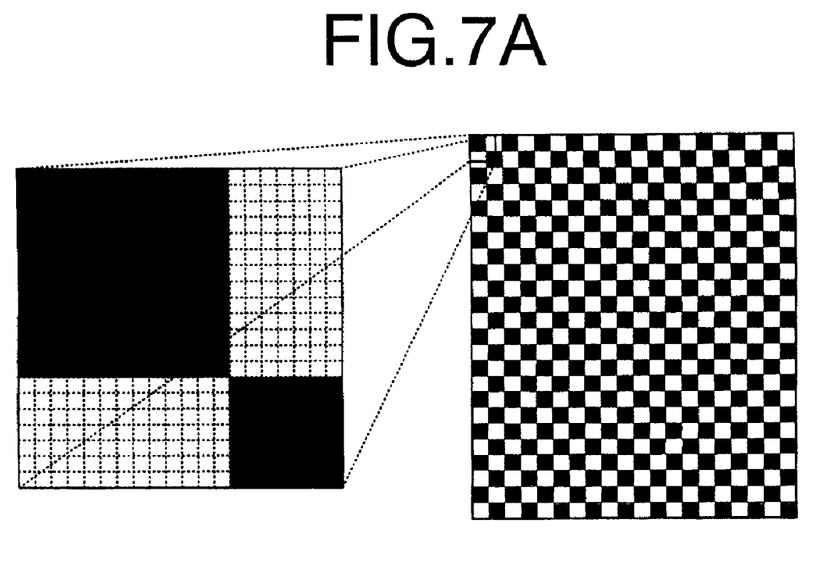
FIG. 7A shows an example of pattern images formed in the display-equivalent area by the test image formation.
Figure 7B:
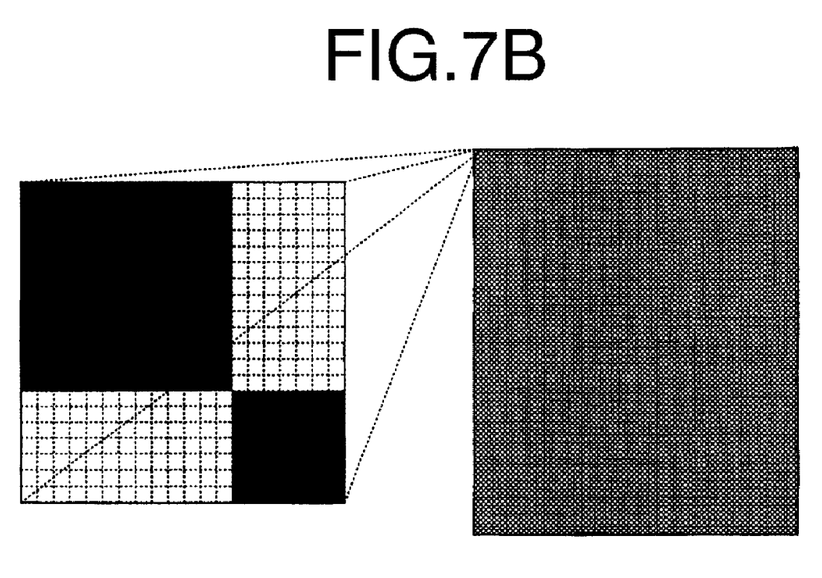
FIG. 7B shows an example of pattern images formed in the printer-equivalent area by the test image formation.

For example, when examining the filling pattern 57 shown in FIG. 5A, the entire area of the display-equivalent area may be filed with the filling pattern 57 as shown on the right side of FIG. 7A, and the entire area of the printer-equivalent area may be filled with the filling pattern 57 as shown on the right side of FIG. 7B.

Note that each of the filling patterns shown in FIGS. 7A and 7B has the same 2 dimensional bit pattern (2D bit pattern) in a unit area which is defined with 20×20 pixels as shown on the left side of each of FIGS. 7A and 7B. However, The appearance of the patter in the printer-equivalent area is different from the appearance of the pattern in the display-equivalent area, as shown on the right side of the each of FIGS. 7A and 7B because of the difference of the resolution.

The printer driver judges whether the 2D bit pattern of the printer-equivalent area is equal to the 2D bit pattern of the display-equivalent area by comparing both the 2D bit patterns (S355). In the examples shown in FIGS. 7A and 7B, the printer driver judges that the 2D bit patterns of the printer-equivalent area is equal to the 2D bit pattern of the display-equivalent area (S355: YES). Therefore, the image formation command is not created taking a resolution correction in consideration and the printer driver sets the resolution correction flag to False (S360).

If the printer driver judges that the 2D bit patterns are different from each other (S355: NO), it is highly possible that the image formation command contains the parameters which have been generated taking the resolution in consideration. Thus, in such a case, the printer driver sets the resolution correction flag to True (S330).

Note that, in S335, when the image formation command is not a filling command (S335: NO), the printer driver sets the resolution correction flag to True since the image formation command is judged as a command for which the resolution correction is not needed (S330).

According to the analyzing process as described above, the resolution correction flag is set to either True or False in S325, S330 or S360. Then, the analyzing process shown in FIG. 4 is terminated.

As described above, according to the PC 1, the analyzing process, which analyzes whether the image formation command depends on the number of the pixels, i.e., whether the image formation command is a command to form an image defined by the number of pixels regardless of the resolution of the image forming area, is performed in S220 (S305-S360) before the image is formed in the print-equivalent area in S230 or S235.

If the PC 1 determines that the image formation command depends on the number of the pixels (S225: NO) as a result of the analyzing process, the PC 1 performs a resolution correction process to increase the number of pixels, and then performs the image forming process with a corrected image formation condition (S235). With regard to the other image formation commands (S225: YES), the image forming process is performed under a condition defined by the image formation command.

Thus, according to the above configuration, even if the image is formed by the image formation command, which depends on the number of pixels, in the printer-equivalent area of which the resolution is higher than that of the display-equivalent area, it can be prevented that the image object is formed with excessively fine lines and patterns. Therefore, it may be possible to bring the appearance of the printed image close to the appearance of the displayed image.

In addition, according to the embodiment, since the resolution ratio is calculated using a formula: Resolution Ratio= (Printer Resolution)/(Display Resolution) in S235 and the resolution correction is performed based on the resolution ratio. Specifically, in the exemplary embodiment, the resolution ratio 6.25 is obtained by dividing the printer resolution 600 DPI by the display resolution 96 DPI in S235 and the resolution correction is performed by multiplying the number of pixels for a line by the resolution ratio 6.25. Therefore, it is possible to bring the appearance of the printed image much closer to the appearance of the displayed image compared to a case where the number of pixels is increased without considering the resolution ratio.

Further, according to the embodiment, the image formation command is executed as a test image forming in S310, S315, S345 and S350 and the PC 1 analyzes whether the number of the pixels or the 2D bit pattern of the printer-equivalent area is equal to that of the display-equivalent area in S320 and S355. Therefore, the PC 1 can determine the necessity of the resolution correction easily and reliably without analyzing the parameters of the image formation command.

In addition, since the image formation command is performed as a test image formation in S310, S315, S345 and S350 and the PC 1 analyzes whether the number of the pixels or the 2D bit pattern of the printer-equivalent area is equal to that of the display-equivalent area in S320 and S355, the PC 1 can reliably judge whether the image formation command depends on the number of the pixels even if a specification of the image formation command has been changed and/or other image formation commands have been introduced.

It is noted that the present invention should not be limited to the configuration of the exemplary embodiment described above. Rather, it should be appreciated that such a configuration can be modified in various ways without departing from the scope of the invention.

For example, although the resolution difference is judged by the test image formation in the exemplary embodiment described above, the difference of the resolution may be judged by a parameter, which represents the line thickness or the brush type, in the image formation command.

Alternatively, if image formation commands depending on the resolution regardless of their parameters are identified, the image formation command depending on the resolution may be judged based on the identified image formation commands In such a case, it is not necessary to check the parameters of the image formation command and perform the test image formation.

Figure 4:
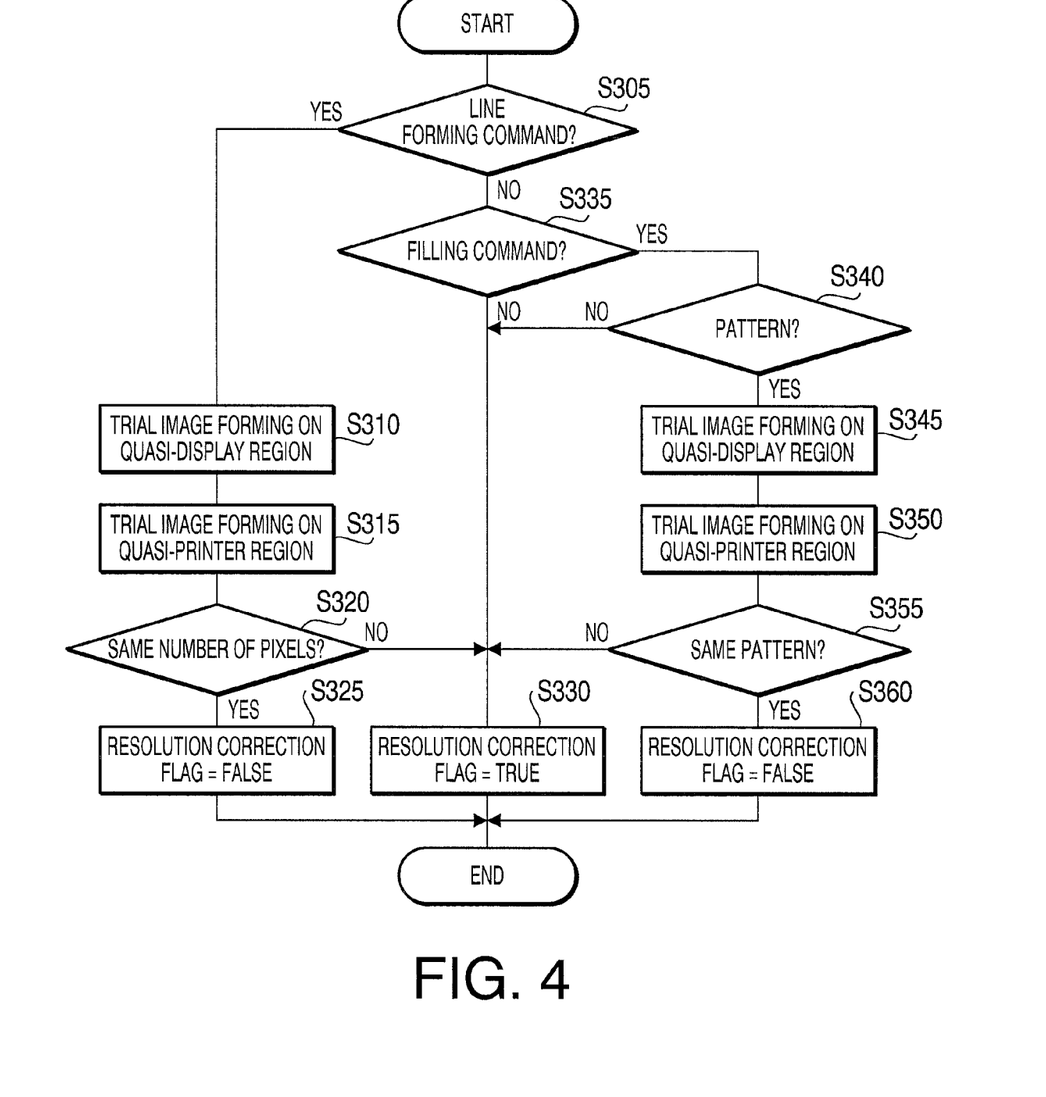
FIG. 4 shows a flowchart illustrating an analyzing process performed in the PC according to the embodiment of the present invention.
Figure 5B:
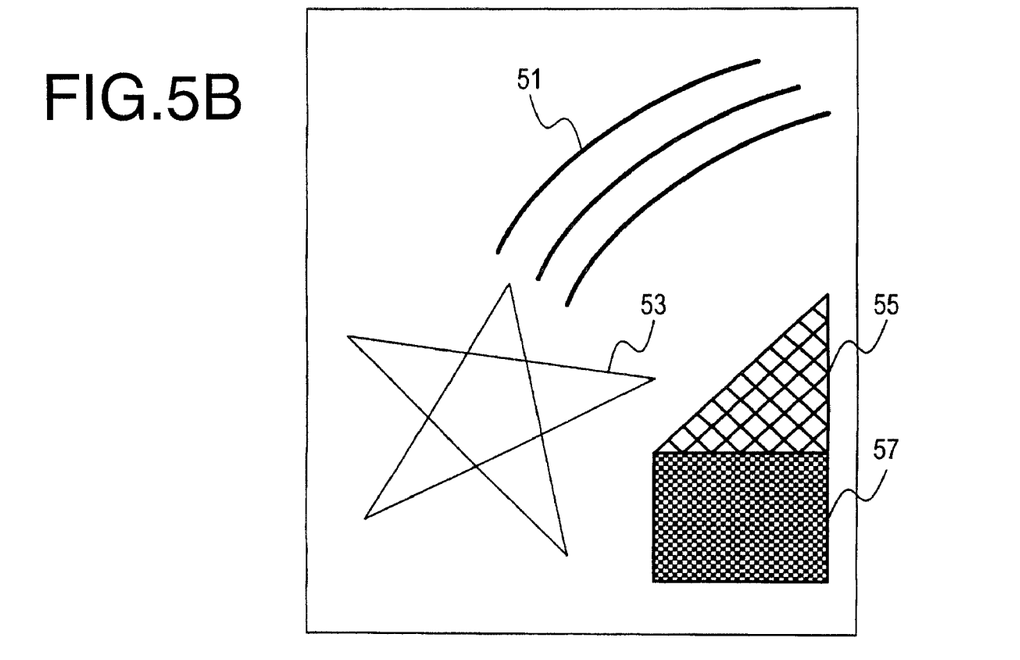
FIG. 5B shows an example of images printed by the printer.
Figure 8:
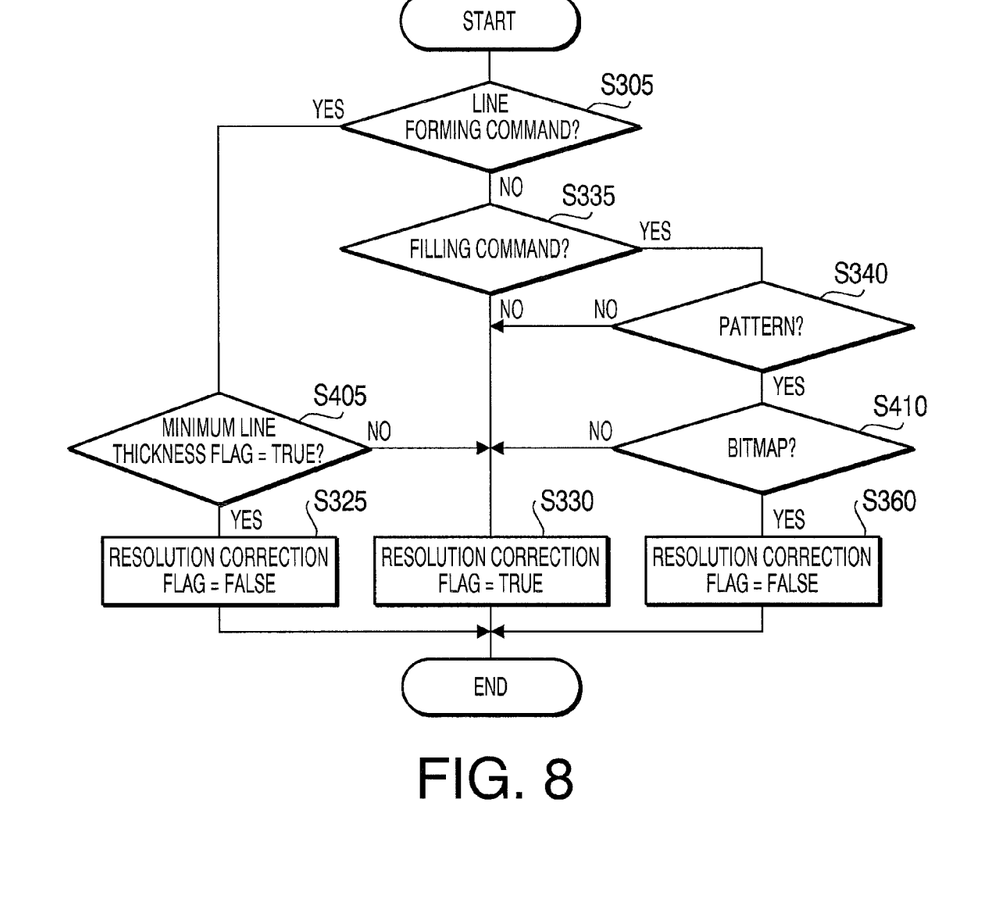
FIG. 8 shows a flowchart illustrating an analyzing process according to a modified embodiment of the present invention.

When an analyzing process without performing the test image formation is employed, the analyzing process in FIG. 4 is replaced with an analyzing process in FIG. 8, which shows a modification of the embodiment. Specifically, S310-S320 in FIG. 4 have been replaced with S405 in FIG. 8, and S345-S355 in FIG. 4 are replaced with S410 in FIG. 8.

In the exemplary embodiment, after forming the test image in S310 and S315, the PC 1 analyzes the number of the pixels of the line to judge whether the number of pixels of the lines in the display-equivalent area and the printer-equivalent area are the same in S320. According to the modification, the PC 1 judges whether the image formation command is a command to form a line with a minimum line thickness, regardless of the resolution, based on a minimum line thickness flag included in the parameters of the image formation command (S405).

Further, according to the embodiment, the PC 1 analyzes the 2D bit pattern of the filling pattern to determine the necessity of the resolution correction in S355 after the test image is formed in S345 and S350. According to the modification, the PC 1 judges whether an area is filled with a pattern specified by a "bitmap" regardless of the resolution, based on whether a pattern setting, which is included in the parameters of the image formation command, represents the "bitmap" or other formats (S410).

It should be noted that there is a case where the settings regarding the filling pattern represents the "bitmap" which is independent of the resolution. In such a case, the process proceeds to S360. On the other hand, if a "hatch pattern," which takes the resolution in consideration, is set as the image pattern setting, the process proceeds to S330.

According to the modification, the PC 1 can judge whether the resolution difference is considered, by examining the image formation command or the parameters of the image formation command, without performing the test image formation.

Note that, an analyzing method according to the modification may be used in association with an analyzing method, which performs the test image formation as is done in the exemplary embodiment. For example, the PC 1 may firstly judge whether an image formation command is a predetermined command or an image formation command contains predetermined parameters. Then, the PC 1 may execute the test image formation when the PC 1 determines that the image formation command is one of the predetermined commands or the image formation command does not contain the predetermined parameters.

According to the exemplary embodiment, although the resolution ratio (i.e., the printer resolution/the display resolution) is calculated in S235 and the resolution correction is performed using the resolution ratio. However, the PC 1 may increase the number of pixels for the line without strictly considering the resolution ratio since some improvement in the difference of appearance between the printed image and the displayed image may be expected by merely increasing the number of the pixels for the line.

For example, in the exemplary embodiment, the resolution ratio 6.25 is obtained by dividing 600 DPI by 96 DPI and the resolution correction is performed by multiplying the number of the pixels for the line by the resolution ratio 6.25. However, the PC 1 may perform the resolution correction by doubling, tripling or quadrupling the number of the pixels for the line since some improvement in the difference of appearance between the printed image and the displayed image can be expected compared to a case where the resolution correction is not applied. Even in such a case, since a judgment for necessity of the resolution correction is made based on each image formation command, the resolution correction is not applied to the image formation command for which the resolution correction is unnecessary.

What is claimed is:

1. An image processing device comprising:
    a display-equivalent image formation area, an image formed on the display-equivalent image formation area being displayed on a display device;
    a printer-equivalent image formation area, an image formed on the printer-equivalent image formation area being printed by a printer;
    a first print data receiving unit configured to receive first print data containing at least one image formation command;
    a judging unit configured to judge whether each image formation command included in the first print data is a pixel number dependent command that defines an image to be formed by the number of pixels;
    a display image formation unit configured to form a display image on the display-equivalent image formation area in accordance with each image formation command included in the first print data;
    a print image formation unit configured to farm a print image on the printer-equivalent image formation area in accordance with each image formation command included in the first print data; and
    a transmission unit configured to transmit the print image formed on the printer-equivalent image formation area to the printer as second print data,
    wherein:
    (1) the print image formation unit forms the print image on the printer-equivalent image formation area with increasing the number of pixels of the print image in accordance with the resolutions of the display-equivalent image formation area and the printer-equivalent image formation area if the judging unit judges that the image formation command is the pixel number dependent command; and
    (2) the print image formation unit forms the print image on the printer-equivalent image formation area without modifying the print image if the judging unit judges that the image formation command is not the pixel number dependent command.

2. The image processing device according to claim 1, further comprising a resolution acquiring unit configured to acquire the resolution a of the display-equivalent age formation area and the resolution b of the printer-equivalent image formation area,
    wherein the print image formation unit obtains a resolution ratio c by dividing b by a, and modifies the number of pixels p of the print image to a modified number of pixels q which is obtained by multiplying p by c.

3. The image processing device according to claim 1, wherein the judging unit judges that each image foimation command is the pixel number dependent command when each image formation command is one of predetermined image formation commands or a parameter included in each image formation command includes a predetermined parameter.

4. The image processing device according to claim 1, wherein the judging unit forms each image on a display-equivalent area, of which the resolution is equal to the resolution of the display, and a printer-equivalent area, of which the resolution is equal to the resolution of the printer, in accordance with and without modifying each image formation command, and then judges whether each image formation command is the pixel number dependent command by comparing an image formed on the display-equivalent area with an image formed on the printer-equivalent area.

5. The image processing device according to claim 1, wherein the print image formation unit changes the number of pixels of the print image to a modified number of pixels, the modified number being obtained by multiplying the number of pixels by a predetermined multiple number.

6. A computer readable storage device containing a computer-executable program for an image processing device, the program, when executed by a computer, causing the image processing device to execute:

a first receiving step of receiving first print data containing at least one image formation command;

a judging step of judging whether each image formation command included in the first print data is a pixel number dependent command that defines an image to be formed by the number of pixels;

a display image formation step of forming a display image on a display-equivalent image formation area in accordance with each image formation command included in the first print data;

a print image formation step of forming a print image on a printer-equivalent image formation area in accordance with each image formation command included in the first print data; and a transmitting step of transmitting the print image formed on the printer-equivalent image formation area to the printer as second print data, wherein:

(1) the print image forming step forms the print image on the printer-equivalent image formation area with increasing the number of pixels of the print image in accordance with the resolutions of the display-equivalent image formation area and the printer-equivalent image formation area if the judging unit judges that the image formation command is the pixel number dependent command and (2) the print image forming step forms the print image on the printer-equivalent image formation area without modifying the print image if the judging unit judges that the image formation command is not the pixel number dependent command.

* * * * *